July 25, 1967  H. E. KLINKENBERG  3,332,145
METHOD OF MAKING A MAGNETIC RING
Filed Dec. 16, 1964  2 Sheets-Sheet 2

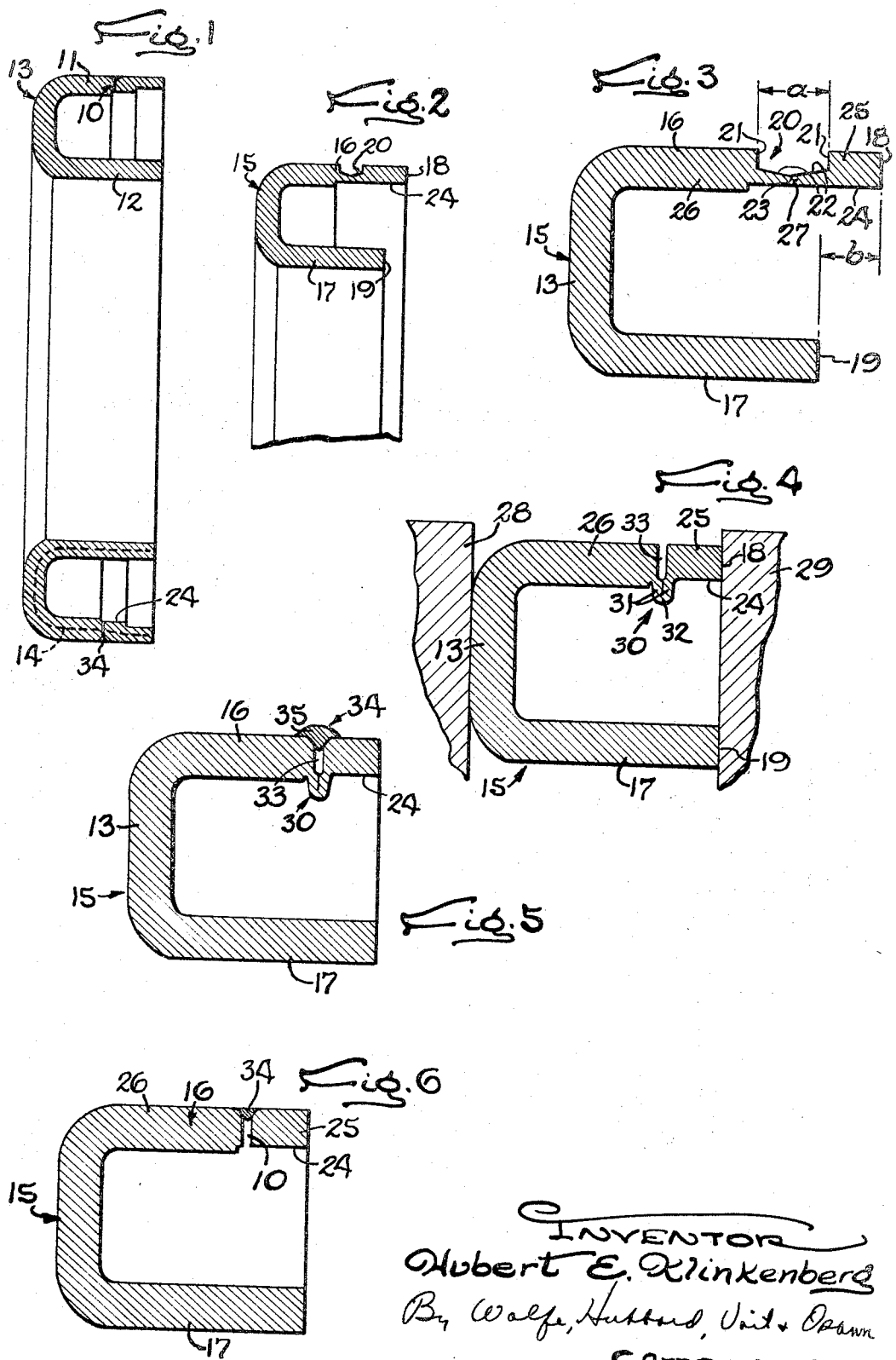

INVENTOR
Hubert E. Klinkenberg
By Wolfe, Hubbard, Voit & Osann
ATTORNEY

United States Patent Office 3,332,145
Patented July 25, 1967

3,332,145
METHOD OF MAKING A MAGNETIC RING
Hubert E. Klinkenberg, Beloit, Wis., assignor to Warner Electric Brake & Clutch Company, South Beloit, Ill.
Filed Dec. 16, 1964, Ser. No. 418,600
9 Claims. (Cl. 29—607)

This invention relates to a magnetic element for use in friction clutches and brakes in which the coupling torque is produced by magnetic flux threading a toroidal path through magnet and armature rings to draw the rings into axial gripping engagement. In such couplings, dissipation of residual magnetism and quick release of the coupling torque is usually achieved by the interposition of a high reluctance gap in the flux circuit between separately formed parts of one of the magnetic rings.

The primary object is to provide a novel method by which a single integral ring of magnetic material may be converted into a friction coupling element of the above character by performing simple and low cost metal working operations thereon.

Another object is to adapt the improved method to the formation of a magnet core of U-shaped radial section with the high reluctance gap interposed in one pole leg and of precisely controlled reluctance value.

The invention also resides in the novel construction of the magnetic ring made by the foregoing method.

Other objects and advantages of the invention will become apparent from the following detailed description taken in connection with the accompanying drawings, in which FIGURE 1 is an actual size diametrical sectional view of a magnetic friction element made in accordance with the present invention.

FIG. 2 is a similar but fragmentary view illustrating the first step of the improved method.

FIGS. 3 to 6 are fragmentary cross-sections illustrating successive steps in the improved method, FIGS. 3 and 6 being enlargements of part of FIGS. 2 and 1 respectively.

Figure 7:
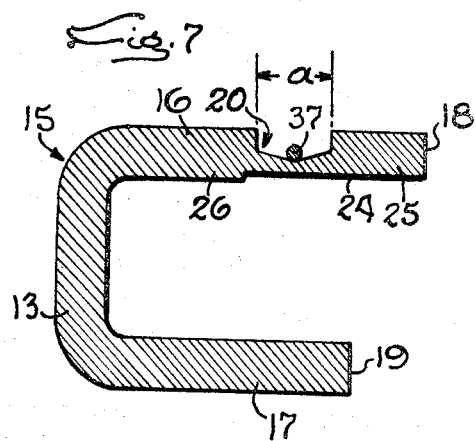
FIGS. 7, 8 and 9 are views similar to FIGS. 3, 4 and 6 showing a modification of the method.
Figure 10:
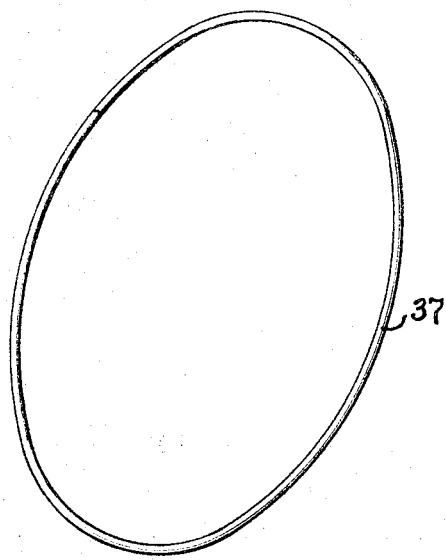
FIG. 10 is a perspective view of one part used in the modified method.

While the invention may be utilized in the manufacture of the armature of a friction coupling of the character described above, it is illustrated in the drawings in connection with the formation of a narrow nonmagnetic annular gap 10 of precise axial width and high reluctance interposed in one of two pole pieces 11 and 12 of a ring 13 of U-shaped cross-section and composed of magnetic iron. In service use, the magnet core forms part 14 of a flux circuit of toroidal shape which is completed through a co-acting armature ring (not shown).

To interpose just enough reluctance in the flux circuit 14 for overcoming the effect of residual magnetism in the unlaminated magnet cores commonly used in friction couplings, the gap 10 is very narrow, for example .025 of an inch for a 4.5 inch magnet of the character shown. A gap of such narrow width cannot be cut directly in the core by ordinary high production machining methods. The present invention enables a gap of such narrow width to be formed from a single-piece iron ring while leaving the separated iron parts rigidly joined together by a ring 34 of nonmagnetic metal spanning and integrally bonded to surfaces of the magnetically separated parts.

To form a magnet core of the above character in accordance with the improved method, a flat ring of iron is die-formed into an annular channel 15 of U-shaped cross-section as shown in FIG. 2 with pole pieces 16 and 17 concentric with the axis of the ring. Preferably and for a purpose to appear later, the pole piece 16 is made wider than the piece 17 by an amount b, the ends 18 and 19 of the pieces being disposed in parallel transaxial planes.

Secondly and in a turning operation, a groove 20 of special shape is cut in the outer periphery of the longer pole piece 16 intermediate the ends thereof. The side walls 21 of the groove are precisely parallel and disposed in transaxial planes while the bottom is defined by surfaces 22 of equal width which converge inwardly and radially and to a center point 23, the angle included between the surfaces 22 being about 165 degrees. The depth of the groove is somewhat more than half the radial thickness of the pole piece. Its width a is determined by the desired width of the final gap 10 to be formed and in the present instance is made precisely equal to the extended length b of the pole piece plus the thickness of the gap 10.

Irregularities that normally result from the die-forming operation are preferably removed as by turning the interior of the pole piece at the outer end portion thereof to form a cylindrical surface 24 which is concentric with the ring axis and accurately spaced from the bottom of the groove. The inner and outer end portions 25 and 26 of the pole piece thus remain rigidly connected by the relatively thin annular section 27 of the original metal of the channel.

By virtue of the convergences of the bottom walls 22 of the groove, the metal of the section 27 is induced to flow inwardly when the pole piece 16 is compressed axially. This is accomplished by placing the grooved channel 15 between platens 28 and 29 of a suitable power actuated press and moving these and the separated portions 25, 26 of the pole piece toward each other an accurately determined distance equal to the width a of the groove less the desired width of the final gap 10. In the present instance, the amount of the collapse of the groove is controlled by the extended length b of the pole piece. Thus, the platens of the press are moved toward each other until stopped by engagement of the platen 29 with the end 19 of the inner pole piece 17.

During the compression of the pole piece and movement of the parts 25, 26 thereof toward each other, the metal of the thin section 27 remains unbroken and flows inwardly and beyond the surface 24, the angle included between the bottom surfaces 22 decreasing progressively until these surfaces come substantially in face to face contact as shown in FIG. 4. Substantially all of the metal of the section 27 is thus displaced inwardly beyond the surface 24 and takes the form of a narrow rib 30 having substantially parallel and contacting sides 31 joined by a closed end 32. The parts 25 and 26 of the pole piece thus separated by the narrowed groove 33 remain connected together by the rib 30 which contains enough of the original iron to hold the element of the parts 25 and 26 and maintain the gap width during the subsequent handling and reconnection of these parts. By correlating the angle of convergence of the bottom surfaces 22 with the width of the groove 20 and the radial thickness of the section 27, it is possible to displace all of the metal of the section inwardly beyond the surface 24 so that the final gap 10 (FIG. 6) extends across the full radial width of the pole parts 25 and 26.

The parts of the pole piece 16, now separated by the narrow gap 33 but held by the iron connection 30 in the desired final relation (FIG. 4), are next reconnected with the rigidity required for service use. This is accomplished by forming around the gap a ring 34 of nonmagnetic metal such as bronze or copper securely bonded to and overlapping surfaces on opposite sides of the gap. When the connecting ring is formed by welding, molten metal produced by a welding tool is flowed in and around the outer edge portion of the gap 33 thus at least partially filling the latter as shown in FIG. 5 while leaving additional metal 35 overlapping and bonded to adjacent portions of the external surfaces of the parts 25 and 26 of the pole piece.

With these parts thus reconnected rigidly, all or substantially all of the iron forming the rib 30 may cut away as by a turning operation. Preferably, the latter is continued outwardly to the radius of the previously machined surface 24. Thus, if all of the metal comprising the original section has been forced inwardly beyond the radius of this surface as is preferred, all of the connecting iron will be removed and the total reluctance of the gap 10 will be determined solely by the gap width as controlled by the grooving and compressing operations above described. If desired, the excess weld metal around the outer surface of the pole may be removed in a turning operation leaving the final cross-section of the ring as shown in FIGS. 1 and 6.

Figure 8:
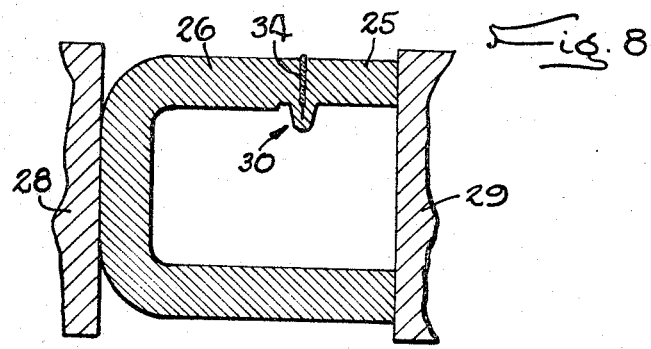
Figure 9:
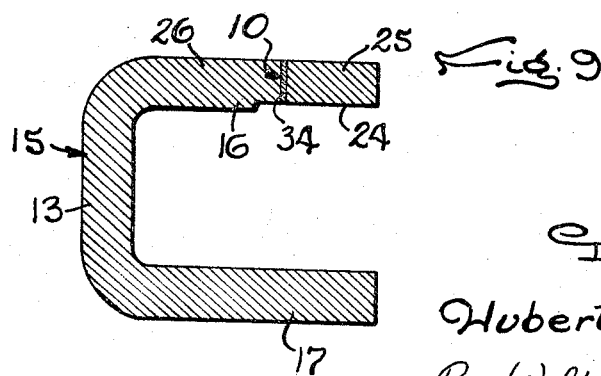

Reconnection of the parts 25 and 26 after compression of the ring may also be effected by copper brazing. To this end, a ring 37 (FIG. 7) of small diameter copper wire is laid around the bottom of the groove 20 formed and dimensioned as above described. The channel 15 is then compressed as before to establish the desired width of the final gap 10 while at the same time compressing the copper ring to the same width. By heating the magnet ring in the usual way, the copper is melted within the narrowed gap and becomes bonded to the walls thereof. By employing a wire of the proper diameter, the entire gap may become filled with the brazing metal 34 as shown in FIG. 8.

Finally, the rib 30 used to maintain the positions of the parts 25 and 26 during the brazing is cut away leaving the parts 25, 26 rigidly joined together but separated by a gap 10 of the desired high reluctance value.

It will be apparent that with the improved method above described, the opposite end portions 25 and 26 of the pole piece 16 remain connected integrally through the grooving, compressing and reconnecting steps while the desired reluctance of the gap 10 is obtained by controlling the initial width of the groove 20 and the extent of its collapse, this being achieved accurately by the simple and low cost machining and pressing operations. Thus, the metal of the parts 25 and 26 in the final cross-section of the ring is the same as in the original stamping 15, these parts being moved closer together as a result of grooving and compressing steps and then reconnected rigidly but magnetically disconnected in the welding and rib-removing steps. Since all of the required steps lend themselves to modern high production procedures, the overall construction of the magnet core is substantially reduced as compared with the methods previously used in forming such a magnet element. At the same time, the reluctance of the final gap 10 is controlled accurately and the desired value thereof easily established at a low manufacturing cost.

I claim as my invention:

1. The method of forming an annular magnetic ring with a narrow annular gap of high reluctance interposed therein including the steps of, cutting in one side surface of said ring an annular groove having substantially parallel side walls and a bottom wall converging toward the opposite side surface, compressing said ring in a direction and by an amount such as to force the metal defining said groove bottom outwardly beyond said opposite surface and thereby narrow the groove to a width corresponding to the value of said high reluctance and cause the metal thus displaced to take the form of an annular rib projecting from said opposite side surface while rigidly joining the portions of the ring on opposite sides of the groove, rejoining said separated portions rigidly together by nonmagnetic metal bridging and bonded to the separated surfaces of said portions, and removing enough of said rib to increase to a desired value the reluctance of the resulting connection between the ports of the ring separated by said nonmagnetic metal.

2. The method defined in claim 1 in which the rejoining of the parts separated by said narrowed groove is effected by a flow of molten metal around the periphery of such parts.

3. The method as defined in claim 2 in which at least part of said molten metal is disposed between the opposed walls of said narrowed groove.

4. The method defined in claim 1 including the step of machining said opposite side surface to form a surface perpendicular to the side walls of said groove and accurately spaced from said groove bottom so as to locate the bottom of the narrowed groove substantially coincident with said machined surface.

5. The method as defined in claim 4 including the step of cutting away substantially all of said rig which projects outwardly beyond said machined surface.

6. The method of forming an annular magnet core of U-shaped radial cross-section with a narrow high reluctance gap interposed therein including the steps of, forming an annular channel of magnetic metal having concentric pole pieces, cutting around one of said pole pieces a groove having radially disposed substantially parallel side walls and a bottom wall converging radially, compressing said channel axially to collapse said one pole piece to narrow said groove to a width corresponding to the value of said high reluctance while causing the metal at and beyond the bottom of the groove to flow radially and take the form of a radial peripheral rib rigidly joining the portions of the pole piece on opposite sides of the groove, bridging said narrowed groove with nonmagnetic metal bonded to the separated parts of the pole piece and rigidly rejoining the latter together, and finally removing enough of said rib to increase to a desired value the reluctance of the resulting connection between the parts of the pole piece separated by said nonmagnetic metal.

7. The method as defined in claim 6 in which said channel is stamped out of sheet metal and including the step of machining said grooved pole piece to form on the side thereof opposite the groove a cylindrical surface accurately spaced from the bottom of said groove.

8. The method as defined in claim 7 including the final step of cutting away substantially all of the metal of said rib which projects beyond said machined surface.

9. The method defined in claim 6 in which the end of said grooved pole piece, before axial compression of said channel, projects beyond the end of the other pole piece a distance substantially equal to the width of the initial groove less the desired width of the narrowed groove and the axial compression of the channel is substantially equal to said distance whereby to bring the ends of said pole pieces substantially into a common plane.

References Cited

UNITED STATES PATENTS

| 1,775,981 | 9/1930 | Warner | 29—155.59 |
| 1,991,681 | 2/1935 | Jones | 29—155.5 |
| 3,229,355 | 1/1966 | Hluszko | 29—155.5 |

JOHN F. CAMPBELL, *Primary Examiner.*

J. C. CLINE, *Assistant Examiner.*